United States Patent
Lee et al.

(10) Patent No.: US 7,694,042 B2
(45) Date of Patent: Apr. 6, 2010

(54) INSTANTANEOUS DATA-DRIVEN CLOCK-GATING DEVICE AND HARD-WIRED STREAMING PROCESSING SYSTEM INCLUDING THE SAME

(75) Inventors: Jin-Aeon Lee, Suwon-si (KR); Yong-Ha Park, Suwon-si (KR); Young-Jin Chung, Seongnam-si (KR); Yun-Kyoung Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 562 days.

(21) Appl. No.: 11/592,123

(22) Filed: Nov. 3, 2006

(65) Prior Publication Data

US 2007/0174514 A1 Jul. 26, 2007

(30) Foreign Application Priority Data

Nov. 3, 2005 (KR) ...................... 10-2005-0105093

(51) Int. Cl.
*G06F 3/00* (2006.01)
*G06F 1/04* (2006.01)
*G06F 1/06* (2006.01)
*G06F 1/08* (2006.01)
*G06F 1/12* (2006.01)
*G06F 13/42* (2006.01)
*H03K 23/40* (2006.01)
*H04L 7/00* (2006.01)

(52) U.S. Cl. .............................. 710/52; 710/53; 710/57; 710/61; 713/323; 713/375; 713/400; 713/500; 713/600; 713/601; 326/93; 377/106

(58) Field of Classification Search .................. None
See application file for complete search history.

(56) References Cited

U.S. PATENT DOCUMENTS

| | | | |
|---|---|---|---|
| 5,185,599 A | * | 2/1993 | Doornink et al. ............ 345/548 |
| 6,204,695 B1 | | 3/2001 | Alfke et al. |
| 6,393,579 B1 | | 5/2002 | Piazza |
| 6,647,502 B1 | * | 11/2003 | Ohmori ...................... 713/322 |
| 6,822,481 B1 | | 11/2004 | Srikantam et al. |
| 6,865,241 B1 | * | 3/2005 | Adkins et al. ............... 375/372 |
| 6,990,598 B2 | * | 1/2006 | Sherburne, Jr. ............. 713/600 |
| 2001/0038633 A1 | * | 11/2001 | Robertson et al. ........... 370/412 |
| 2002/0175839 A1 | * | 11/2002 | Frey ............................ 341/50 |
| 2005/0026584 A1 | * | 2/2005 | Lewis ...................... 455/245.1 |

FOREIGN PATENT DOCUMENTS

| | | |
|---|---|---|
| JP | 2002-176145 | 6/2002 |
| KR | 2001-0100565 | 11/2001 |
| KR | 2004-0035499 | 4/2004 |
| KR | 2005-0097226 | 10/2005 |

\* cited by examiner

*Primary Examiner*—Tanh Q Nguyen
(74) *Attorney, Agent, or Firm*—Harness, Dickey & Pierce, P.L.C.

(57) ABSTRACT

Digital logic processing devices capable of reduced power consumption may be provided. A digital logic processing device may include one or more processing elements, an input FIFO for storing data, a processing unit, and a clock controller circuit. The processing unit may process data from the input FIFO and the clock controller circuit may control a clock signal supplied to the input FIFO and the processing unit. The clock controller circuit may monitor whether there is data to be transferred to the input FIFO and states of the input FIFO and the processing unit and may control the clock signal.

12 Claims, 5 Drawing Sheets

Hard-wired processing system

INSTANTANEOUS DATA-DRIVEN CLOCK-GATING DEVICE AND HARD-WIRED STREAMING PROCESSING SYSTEM INCLUDING THE SAME

PRIORITY STATEMENT

This application claims the benefit of priority under 35 U.S.C §119 to Korean Patent Application No. 2005-105093, filed on Nov. 3, 2005, in the Korean Intellectual Property Office, the entire contents of which is incorporated herein in its entirety by reference.

BACKGROUND

1. Field

Example embodiments relate to a semiconductor integrated circuit and, for example, a clock control technique of an integrated circuit.

2. Description of Related Art

In modern VLSI designs, clock power is a design limitation. In spite of increasing of power leakage, clock power may take a relatively large portion of total power consumption within a modern microprocessor. Clock gating has been proposed as a technique for reducing dynamic power consumption. Clock gating may be one power saving technique that may be applied to logic blocks.

With conventional gating techniques, it is possible to reduce power consumption by making an integrated circuit operate at a clock signal of a relatively low frequency based on loading of application programs. Further, a method has been used which interrupts a clock signal applied to processing units unnecessary for an operation based on the control of software. In the case of clock gating using software control, the unit of a circuit to be controlled may be relatively large and it may be impossible to gate a clock in a desired time unit.

SUMMARY

Example embodiments may be directed to a digital logic processing device which may include one or more processing elements. Each processing element may further include an input FIFO for storing data; a processing unit for processing data from the input FIFO; and a clock controller circuit for controlling a clock signal supplied to the input FIFO and the processing unit.

According to an example embodiment, the clock controller circuit may monitor whether there is data to be transferred to the input FIFO and states of the input FIFO and the processing unit and may control the clock signal.

In an example embodiment, there may be processing elements configured to operate in a hard-wired streaming processing manner, and in each of the processing elements the input FIFO may store data from a processing element of a previous stage and may output a first flag signal indicating whether a valid data exists; the processing unit may process data from the input FIFO in response to the first flag signal and may output a second flag signal indicating whether data from the input FIFO has been processed and has been transferred by the processing unit; and the clock controller circuit may control a clock signal to be supplied to the input FIFO and the processing unit in response to a valid signal and the first and second flag signals, the valid signal indicating whether valid data is prepared in the processing unit of the previous stage.

Example embodiments may be directed to a digital logic processing device which may include an input FIFO for storing data transferred from the exterior of the digital logic processing device; a processing unit for processing data from the input FIFO; and a clock controller circuit for controlling a clock signal supplied to the input FIFO and the processing unit, wherein the clock controller circuit may monitor a presence state of data to be transferred to the input FIFO and states of the input FIFO and the processing unit and may control the clock signal.

Example embodiments may be directed to a digital logic processing device which may include a plurality of processing elements that may be configured to operate in a hard-wired streaming processing manner, each of the processing elements may include an input FIFO for storing data from a processing element of a previous stage and outputting a first flag signal indicating whether valid data exists; a processing unit for processing data from the input FIFO in response to the first flag signal and outputting a second flag signal indicating whether data from the input FIFO has been processed and transferred by the processing unit; and a clock controller circuit for controlling a clock signal to be supplied to the input FIFO and the processing unit in response to a valid signal and the first and second flag signals, the valid signal indicating whether valid data may be prepared in the processing unit of the previous stage.

Example embodiments may be directed to a method of gating a clock signal supplied to a digital logic processing device. The method may include receiving external data in synchronization with a clock signal; processing the external data in synchronization with the clock signal; and interrupting the clock signal based on whether additional external data to be received exists and whether the processing of the received data may be completed.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1:
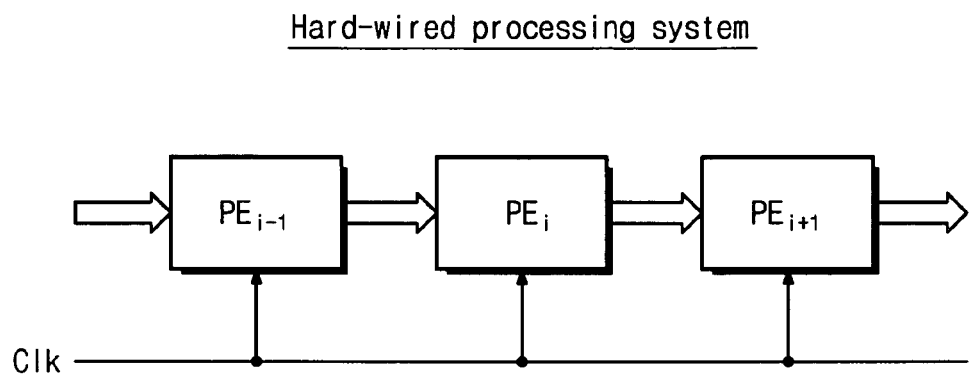
FIG. 1 is a block diagram showing a hard-wired streaming processing system according to an example embodiment.

Example embodiments will now be described more fully hereinafter with reference to the accompanying drawings. Embodiments may, however, be in many different forms and should not be construed as limited to the example embodiments set forth herein. Rather, these example embodiments are provided so that this disclosure will be thorough and complete, and will fully convey the scope to those skilled in the art. In the drawings the thickness of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

FIG. 1 shows a schematic block diagram of a data processing system according to an example embodiment.

Figure 2:
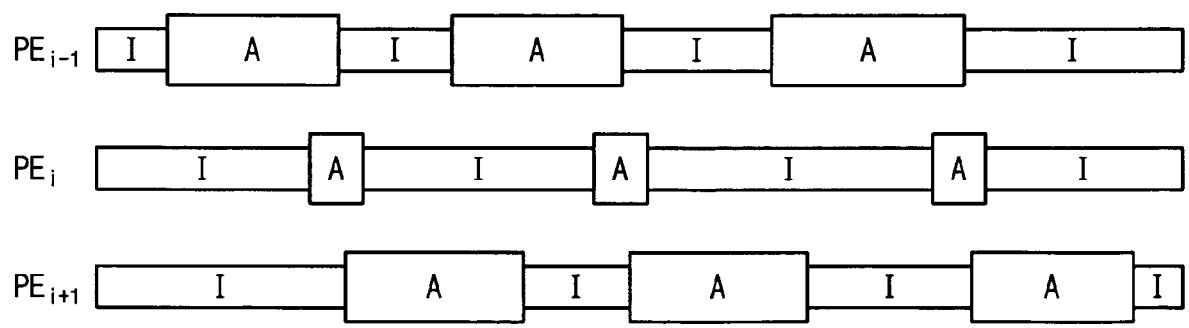
FIG. 2 is an example diagram showing process states of processing elements of a hard-wired streaming processing system illustrated in FIG. 1.

A data processing system in FIG. 1 may include a plurality of processing elements (hereinafter, referred to as "PE") supplied with a global clock signal Clk. Each PE may be implemented as a digital logic processing device. As illustrated in FIG. 1, the data processing system may be configured to have a hard-wired streaming processing form. For example, any PE, for example PEi, may process output data from a previous PE, for example PEi−1, and may output the processed data to a next PE, for example PEi+1, as input data. As illustrated in FIG. 2, in such repetitive processing, each PE may be put repetitively at an active state and an idle state in a case where dependency of input data may be different from that of an intermediate PE. The data processing system according to an example embodiment may use an instantaneous data-driven clock-gating (hereinafter, referring to as "IDDC") manner without the intervention of any software. For example, when PEi is put at an idle state, supplying of a clock signal to the PEi may be internally interrupted. For example, when PEi is put at an idle state, supplying of a clock signal to the PEi may be internally interrupted instantaneously and immediately. With this clock control/gating scheme, it may be possible to save dynamic power dissipation without the intervention of software.

Figure 3:
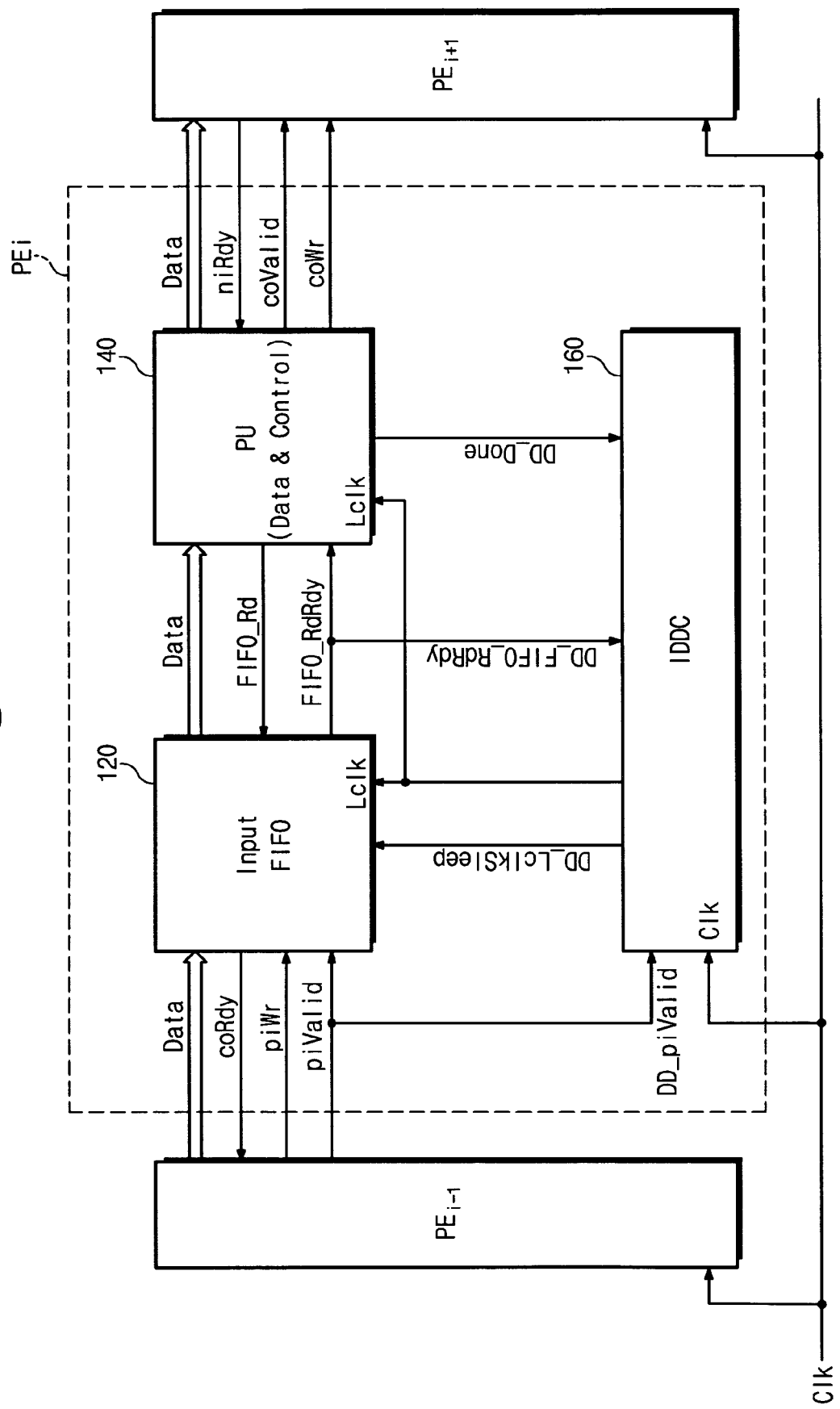
FIG. 3 is an example block diagram showing a processing element illustrated in FIG. 1.

FIG. 3 is a block diagram showing one of the processing elements illustrated in FIG. 1. Referring to FIG. 3, as a digital logic processing device, a processing element PEi according to an example embodiment may comprise an input FIFO 120, a processing unit 140, and/or a clock controller circuit 160 (in FIG. 3, marked by "IDDC"). The remaining processing elements PEi−1 and PEi+1 may be configured in the same manner as illustrated in FIG. 3, and description thereof may thus be omitted. As understood from FIG. 3, the input FIFO 120 may be used as an output buffer of the previous processing element PEi−1. The clock controller circuit 160 according to an example embodiment may interrupt a gated local clock signal Lclk, which may be supplied to the input FIFO 120 and the processing unit 140, when the following conditions are satisfied. For example the clock controller circuit 160 may instantaneously and immediately interrupt a gated local clock signal Lclk, which may be supplied to the input FIFO 120 and the processing unit 140, when the following conditions are satisfied. For example, the clock controller circuit 160 may interrupt the gated local clock signal Lclk to the input FIFO 120 and the processing unit 140 when the input FIFO 120 is empty, a work of the processing unit 140 is completed, and no valid data is prepared in PEi−1 of a previous stage. This will be more fully described below.

Figure 4:
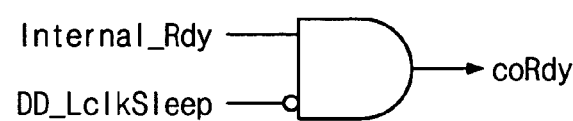
FIG. 4 is an example circuit diagram showing a part of an input FIFO illustrated in FIG. 3.

For example, the input FIFO 120 may output a ready signal coRdy indicating a current FIFO state to the previous PEi−1 in response to a control signal DD_LclkSleep from the clock controller circuit 160. The ready signal coRdy may indicate whether the input FIFO 120 is not fully filled. As illustrated in FIG. 4, the ready signal coRdy may be generated by a combination of an internal signal Internal_Rdy and the control signal DD_LclkSleep. For example, when the control signal DD_LclkSleep indicates interruption of the gated local clock signal Lclk, the ready signal coRdy may be inactivated regardless of the internal signal Internal_Rdy. Inactivation of the internal signal Internal_Rdy may indicate that the input FIFO 120 may not be ready to receive data. In other words, in a case where the gated local clock signal Lclk may be inactivated (or the control signal DD_LclkSleep may be activated), it may be possible to prevent a previous PE from writing data abnormally by inactivating the ready signal coRdy, which will be more fully described below. The input FIFO 120 may receive a write signal piWr and/or a valid signal piValid from a previous PEi−1 and the gated local clock signal Lclk from the clock controller circuit 160. The valid signal piValid may indicate whether valid data may be prepared in a previous PEi−1, and the write signal piWr may indicate that valid data may be transferred. When the input signals piValid and piWr are activated according to a desired or given timing, the input FIFO 120 may latch data from the previous PEi−1 in synchronization with the gated local clock signal Lclk. The input FIFO 120 may output to the processing unit 140 a control signal FIFO_RdRdy indicating that valid data exists (or that the input FIFO may not be empty). The input FIFO 120 may output data to the processing unit 140 in response to a control signal FIFO_Rd from the processing unit 140.

The processing unit 140 may process data from the input FIFO 120 and may output the processed data to a next PEi+1. The processing unit 140 may output the control signal FIFO_Rd as a pulse in response to the control signal FIFO_RdRdy. For example, when the control signal FIFO_RdRdy indicates that data exists in the input FIFO 120, the processing unit 140 may output the control signal FIFO_Rd as a pulse shape to the input FIFO 120. The input FIFO 120 may output data to the processing unit 140 in response to the control signal FIFO_Rd. If data from the input FIFO 120 has been processed and the processed data has been transferred to the next PEi+1, the processing unit 140 may output to the clock controller circuit 160 a control signal DD_Done indicating that a work of the processing unit 140 may be completed. As described above, the processing unit 140 may output an idle signal coValid and a write signal coWr to the next PEi+1 in response to a ready signal niRdy from the next PEi+1.

Continuing to refer to FIG. 3, the clock controller circuit 160 may operate responsive to a global clock signal Clk and the control signals DD_piValid, DD_FIFO_RdRdy, and/or DD_Done, and may control a gated local clock signal Lclk supplied to the input FIFO 120 and the processing unit 140. The clock controller circuit 160 may interrupt the gated local clock signal Lclk to the input FIFO 120 and the processing unit 140 when the input FIFO 120 is empty, a work of the processing unit 140 may be completed, and no valid data may be prepared in the previous PEi−1. When the above conditions are satisfied, the clock controller circuit 160 outputs a control signal DD_LclkSleep to the input FIFO 120 so that the ready signal coRdy may be inactivated. If any one of the above conditions may not be satisfied, the clock controller circuit 160 may inactivate the control signal DD_LclkSleep and may supply the gated local clock signal Lclk to the input FIFO 120 and the processing unit 140.

As understood from the above description, when any PE is at an idle state, the gated local clock signal Lclk supplied to the input FIFO 120 and the processing unit 140 may be interrupted without the intervention of software based on the control of the clock controller circuit 160. For example, when any PE is at an idle state, the gated local clock signal Lclk supplied to the input FIFO 120 and the processing unit 140 may be interrupted instantaneously and immediately without the intervention of software based on the control of the clock controller circuit 160. Likewise, when any PE is set to an active state, the gated local clock signal Lclk may be supplied to the input FIFO 120 and the processing unit 140 without the intervention of software based on the control of the clock controller circuit 160. For example when any PE is set to an active state, the gated local clock signal Lclk may be supplied to the input FIFO 120 and the processing unit 140 instantaneously and immediately without the intervention of software based on the control of the clock controller circuit 160. With this clock gating scheme, saving of power consumption may be accomplished without intervention of software.

Figure 5:
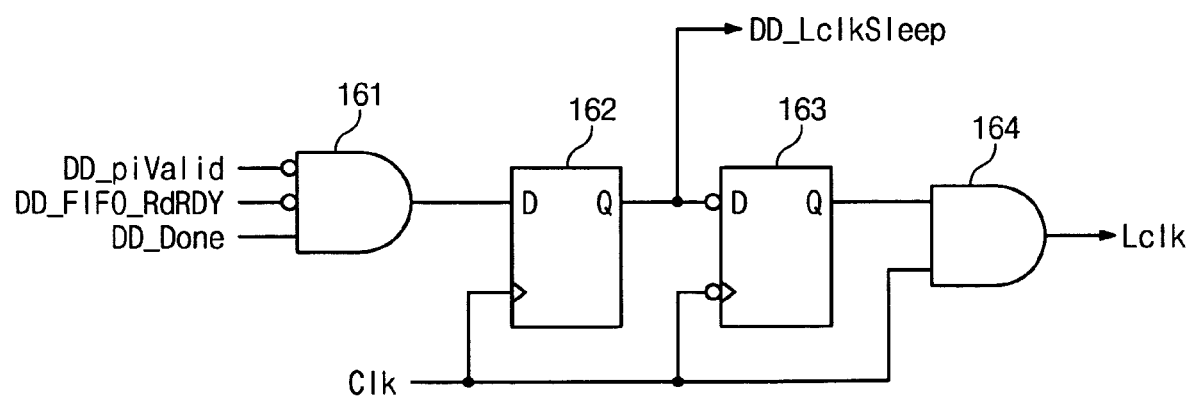
FIG. 5 is an example circuit diagram showing a clock controller circuit illustrated in FIG. 3.

FIG. 5 is a circuit diagram showing an example embodiment of a clock controller circuit illustrated in FIG. 3. Referring to FIG. 5, the clock controller circuit 160 may control a global clock signal Clk in response to control signals DD_piValid, DD_FIFO_RdRdy and/or DD_Done. As set forth above, the control signal DD_piValid may be a flag signal informing whether valid data may exist in a previous PEi−1, the control signal DD_FIFO_RdRdy may be a flag signal indicating whether an input FIFO 120 may be empty, and the control signal DD_Done may be a signal indicating whether a processing unit 140 has completed a work. The clock controller circuit 160 may comprise AND gates 161 and 164 and D-type flip-flops 162 and 163. The AND gate 161 may be supplied with the control signal DD_Done, an inverted version of the control signal DD_piValid, and an inverted version of the control signal DD_FIFO_RdRdy. The D-type flip-flop 162 may latch an output of the AND gate 161 in synchronization with the global clock signal Clk and may output the latched signal as a control signal DD_LclkSleep. The D-type flip-flop 163 may latch an inverted version of the control signal DD_LclkSleep in synchronization with an inverted version of the global clock signal Clk. The AND gate 164 may receive an output of the D-type flip-flop 163 and the global clock signal Clk to output a gated local clock signal Lclk.

In FIG. 5, the AND gate 161 may act as a detector for detecting an entry into a clock-off state and an entry into a clock-on state. The clock-off state may indicate the state where supplying of the gated local clock signal may be interrupted, and the clock-on state may indicate the state where the gated local clock signal Lclk may be supplied to the input FIFO 120 and the processing unit 140. The control signal DD_LclkSleep may be used as a flag signal indicating a clock on/off state. As a flip-flop structure may be applied to the clock controller circuit 160 in FIG. 5, the control signal DD_LclkSleep may be generated without glitch. However, it may be obvious to one skilled in the art that a latch structure may be applied to the clock controller circuit 160 instead of the flip-flop structure.

FIGS. 6 to 9 are example timing diagrams for describing a clock gating scheme of a data processing system according to example embodiments. Below, a clock gating scheme of a data processing system according to an example embodiment will be more fully described with reference to accompanying drawings. In hard-wired streaming processing, an operating state of each PE may repetitively transition from an idle state to an active state and from an active state to an idle state. Herein, each PE may enter the idle state when the following conditions are satisfied and supplying of a clock signal to an input FIFO and a processing unit of each PE is interrupted. Each PE may enter the idle state when an input FIFO 120 is empty, a work of a processing unit 140 is completed, and no valid data exists in a previous PE. For example, each PE may enter the idle state instantaneously and immediately when an input FIFO 120 is empty, a work of a processing unit 140 is completed, and no valid exists in a previous PE. For example, a clock gating scheme according to an example embodiment will be described on the basis of PEi.

Figure 6:
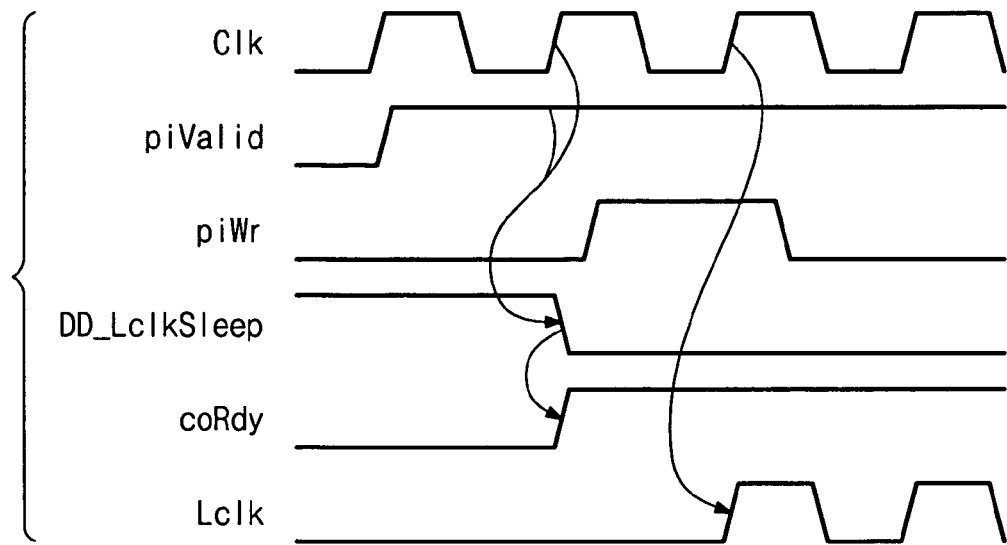
FIGS. 6 to 9 are example timing diagrams showing control signals of a processing element illustrated in FIG. 3.

In a case where PEi may be at an idle state, a control signal DD_LclkSleep may be maintained high. This makes a ready signal coRdy go to a low level. For example, the ready signal coRdy may indicate that an input FIFO 120 of the PEi may not be ready for receiving data. If valid data may be prepared in a previous PEi−1, as illustrated in FIG. 6, a valid signal piValid may be activated high. A clock controller circuit 160 of the PEi may inactivate a control signal DD_LclkSleep low in response to the activation of the valid signal piValid. For example, when the PEi is at the idle state, control signals DD_piValid, DD_FIFO_RdRdy and DD_Done input to an AND gate 161 of the clock controller circuit 160 may have a low level, a low level, and a high level, respectively. For example, an output of the AND gate 161 may go high. Accordingly, a D-type flip-flop 162 in FIG. 5 may output a control signal DD_LclkSleep of a high level, and a D-type flip-flop 163 may output a signal of a low level. This may make a gated local clock signal Lclk be interrupted. For example, as illustrated in FIG. 6, the gated local clock signal Lclk may not be supplied to the input FIFO 120 and the processing unit 140.

If a previous PEi-1 activates a valid signal piValid high (or valid data exists in the previous PEi-1), the clock controller circuit 160 of the PEi may inactivate the control signal DD_LclkSleep low at a next clock cycle in response to a control signal DD_piValid. This may enable a ready signal coRdy from the input FIFO 120 to transition from a low level to a high level. As the control signal DD_LclkSleep may be inactivated low, as illustrated in FIG. 6, the clock controller circuit 160 may supply the gated local clock signal Lclk to the input FIFO 120 and the processing unit 140. For example, the PEi may go to a clock-on state. The previous PEi-1 may transfer a write signal piWr of a pulse shape to the PEi in response to the ready signal coRdy. Although not shown in figures, data to be processed may be transferred from the PEi-1 to the PEi according to a desired or given timing. As understood from the above description, when the PEi is switched to the idle state from the active state, supplying of a clock signal to the PEi may be controlled/gated by the clock controller circuit 160 without the intervention of software. For example when the PEi is switched to the idle state from the active state, supply of a clock signal to the PEi may be controlled/gated by the clock controller circuit 160 instantaneously and immediately without the intervention of software.

Power consumption may be minimized by the following manner when the PEi is switched to the idle state from the active state.

Figure 7:
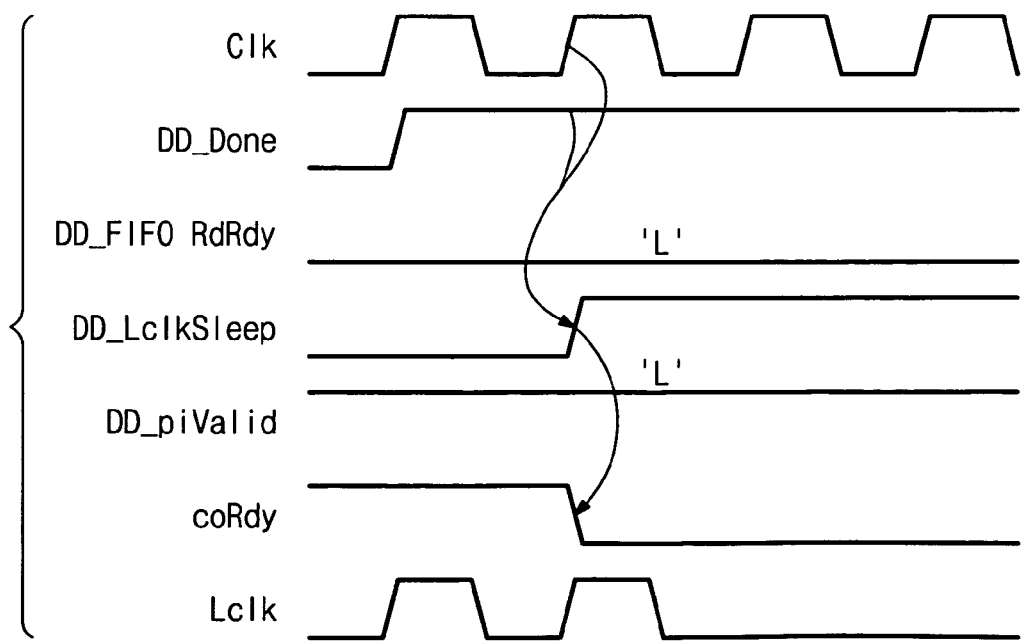

When the above conditions are satisfied, the PEi is switched to the idle state and simultaneously goes to a clock-off state. For example, the PEi may enter the idle state when the input FIFO 120 is empty, a work of the processing unit 140 is completed, and no valid data to be transferred from the PEi-1 exists. For example, the PEi may enter the idle state instantaneously and immediately when the input FIFO 120 is empty, a work of the processing unit 140 is completed, and no valid data to be transferred from the PEi-1 exists. In other words, when the control signals DD_piValid and DD_FIFO_RdRdy are at a low level and the control signal DD_Done is at a high level, the clock controller circuit 160 of the PEi may activate the control signal DD_LclkSleep high in synchronization with the clock signal Clk. As the control signal DD_LclkSleep may be activated high, as illustrated in FIG. 7, the gated local clock signal Lclk to the input FIFO 120 and the processing unit 140 may be interrupted. The input FIFO 120 may inactivate the ready signal coRdy low in response to the control signal DD_LclkSleep of a high level. As understood from the above description, when the PEi is switched to the idle state from the active state, supplying of a clock signal to the PEi may be controlled by the clock controller circuit 160 without the intervention of software. For example, when the PEi is switched to the idle state from the active state, supplying of a clock signal to the PEi may be controlled by the clock controller circuit 160 instantaneously and immediately without the intervention of software.

Figure 8:
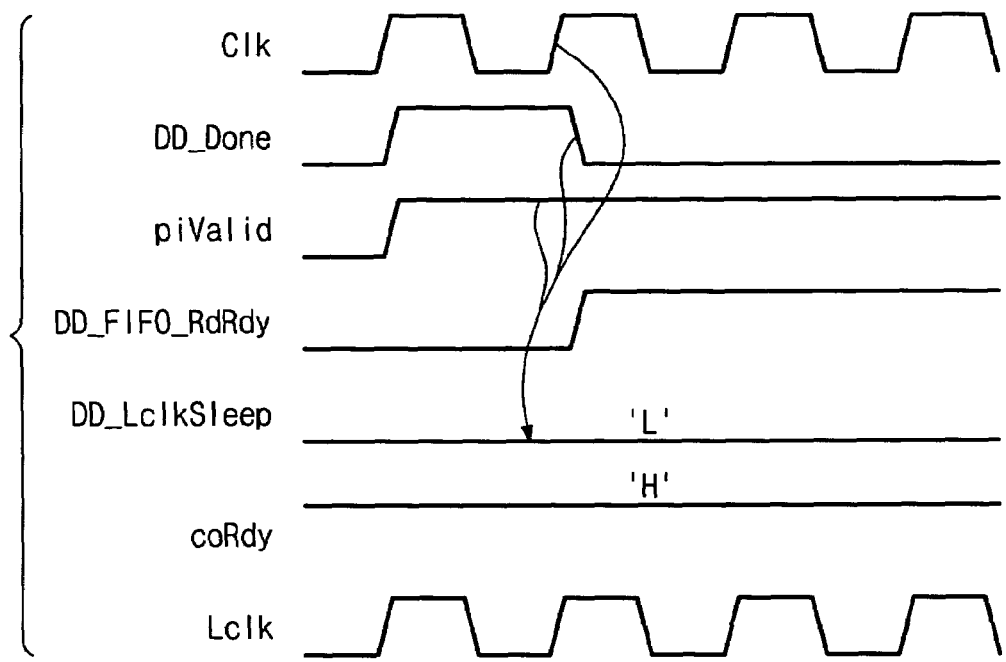
Figure 9:
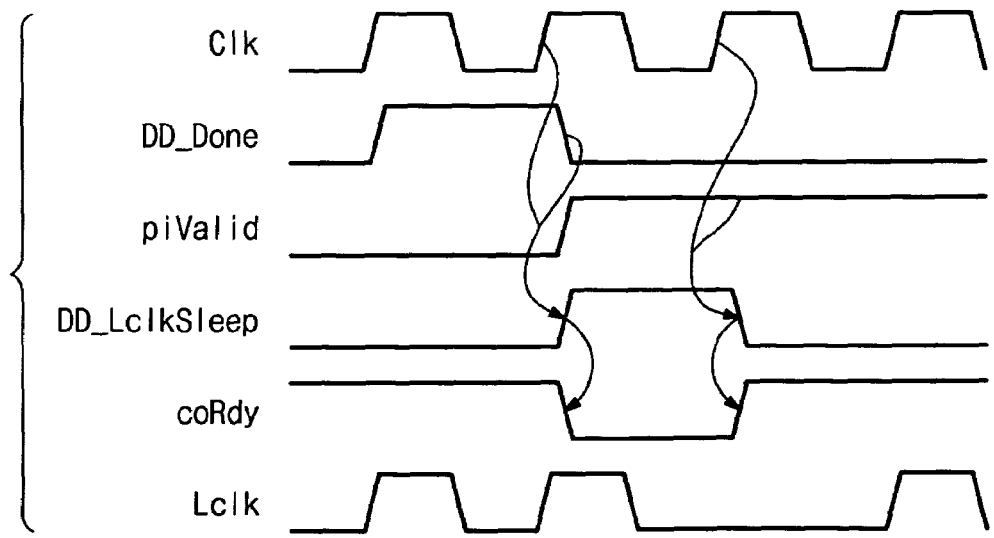

With the clock gating scheme of example embodiments, in a case where a point of time when the processing unit 140 completes its work coincides with a point of time when valid data is prepared in a previous PE, as illustrated in FIG. 8, the gated local clock signal Lclk may continue to be supplied without interruption. In other words, in a case where valid data may not be prepared at the previous PE at a point of time when the processing unit 140 completes its work, the clock controller circuit 160 may activate the control signal DD_LclkSleep. This may make the gated local clock signal Lclk be not supplied to the input FIFO 120 and the processing unit 140. However, in a case where a point of time when the processing unit 140 completes its work may coincide with a point of time when valid data is prepared in a previous PE, as illustrated in FIG. 8, the control signal DD_LclkSleep may continue to be maintained low. This means that the gated local clock signal Lclk may be continuously supplied to the input FIFO 120 and the processing unit 140. In a case where a point of time when valid data is prepared in a previous PE is later by one cycle than a point of time when the processing unit 140 may complete its work, as illustrated in FIG. 9, the gated local clock signal Lclk may be interrupted by the clock controller circuit 160 by one cycle. However, the remaining operations (switching operations from an idle state to an active state and from the activate state to the idle state) may be sufficiently identical to those described above, and description thereof is thus omitted.

The processing unit according to an example embodiment may consist of one or more registers. It may be possible that a clock controller circuit according to an example embodiment may be respectively added to an input FIFO and a processing unit so as to have a hierarchical clock gating scheme. A processing unit of each PE may be implemented with a digital logic circuit that may be configured to be defined freely by a designer. For example, automatic hard-wired clock gating may be possible with respect to a circuit having a designer-defined unit. Further, in the case of properly distributing a processing unit to which clock gating may be applied, it may be possible to optimize dynamic power consumption of a hardware accelerator that performs a pipelined data processing operation.

As set forth above, dynamic power dissipation may be saved without the intervention of software by interrupting supplying of a clock to a PEi when the PEi is put at an idle state and resuming supplying of a clock signal to the PEi when the PEi is put at an active state. For example, dynamic power dissipation may be saved without the intervention of software by instantaneously and immediately interrupting supplying of a clock to a PEi when the PEi is put at an idle state and resuming supplying of a clock signal to the PEi when the PEi is put at an active state. For example, as a clock signal may be interrupted which may be supplied to a clock distributing circuit including a clock tree distribution circuit within a PE, it may be possible to save dynamic power dissipation of the clock distributing circuit that may take a major portion of power dissipation within a digital synchronous circuit.

Although example embodiments have been shown and described in this specification and figures, it would be appreciated by those skilled in the art that changes may be made to the illustrated and/or described example embodiments without departing from their principles and spirit, the scope of which is defined by the claims and their equivalents.

What is claimed:

1. A digital logic processing device comprising:
   a first processing element and at least one subsequent processing element, wherein each processing element of the at least one subsequent processing element includes:
   an input FIFO for storing data,
   a processing unit for processing data from the input FIFO, and
   a clock controller circuit for controlling a clock signal supplied to the input FIFO and the processing unit, wherein
   the clock controller circuit includes
      a detector for detecting an entry into a clock-off state indicating a state of interrupting the clock signal, and for detecting an entry into a clock-on state indicating a state of supplying the clock signal;
      a first flip-flop for latching an output of the detector in synchronization with the clock signal;

a second flip-flop for latching an inverted output signal of the first flip-flop in synchronization with an inversion of the clock signal; and an AND gate for receiving the clock signal and for outputting the clock signal to the input FIFO and the processing unit based on an output of the second flip-flop.

2. The digital logic processing device of claim 1, wherein the clock controller circuit monitors whether there is data to be transferred to the input FIFO, monitors states of the input FIFO and the processing unit, and controls the clock signal.

3. The digital logic processing device of claim 2, wherein the clock controller circuit interrupts the clock signal when the monitorings indicate an idle state.

4. The digital logic processing device of claim 3, wherein the idle state is established when no data to be transferred to the input FIFO exists, the input FIFO is empty, and data from the input FIFO has been processed and has been transferred by the processing unit.

5. The digital logic processing device of claim 4, wherein the clock controller circuit supplies the clock signal to the input FIFO and the processing unit when valid data to be transferred to the input FIFO exists subsequent to the idle state being established.

6. The digital logic processing device of chum 2, wherein the processing unit includes at least one register.

7. The digital logic processing device of claim 1, wherein the at least one subsequent processing element is a plurality of processing elements configured to operate in a hard-wired streaming processing manner, and in each processing element of the plurality of processing elements, the input FIFO stores data from a processing element of a previous stage and outputs a first flag signal indicating whether valid data exists;

the processing unit processes data from the input FIFO in response to the first flag signal and outputs a second flag signal indicating whether the data from the input FIFO has been processed and has been transferred; and the clock controller circuit controls the clock signal to be supplied to the input FIFO and the processing unit in response to a valid signal, the first flag signal and the second flag signal, the valid signal indicating whether valid data to be transferred to the input FIFO exists in the processing unit of the previous stage.

8. The digital logic processing device of claim 7, wherein the clock controller circuit generates a third flag signal indicating a clock off state when a combination of the first and second flag signals indicates an idle state.

9. The digital logic processing device of claim 8, wherein the input FIFO provides the processing unit of the previous stage with information indicating that the input FIFO is not prepared to receive data, in response to the third flag signal.

10. The digital logic processing device of claim 8, wherein the input FIFO of each processing element of the plurality of processing elements acts as an output buffer of a processing element of a previous stage.

11. The digital logic processing device of claim 8, wherein the detector detects whether a combination of the valid signal and the first and second flag signals indicates the idle state.

12. The digital logic processing device of claim 11, wherein an output signal of the first flip-flop is used as the third flag signal indicating the clock off state.

* * * * *